(12) United States Patent
Lionetti et al.

(10) Patent No.: US 8,006,038 B2
(45) Date of Patent: Aug. 23, 2011

(54) OPTIMIZING INFORMATION LIFECYCLE MANAGEMENT FOR FIXED STORAGE

(75) Inventors: Christopher Lionetti, Duvall, WA (US); Sompong Paul Olarig, Pleasanton, CA (US); Vladimir Sadovsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 12/244,454

(22) Filed: Oct. 2, 2008

(65) Prior Publication Data

US 2010/0088470 A1   Apr. 8, 2010

(51) Int. Cl.
*G06F 12/08* (2006.01)
(52) U.S. Cl. ......... 711/118; 711/133; 711/154; 711/171
(58) Field of Classification Search .................. 711/118, 711/133, 154, 171
See application file for complete search history.

(56) References Cited

U.S. PATENT DOCUMENTS

| | | |
|---|---|---|
| 7,007,048 B1 | 2/2006 | Murray et al. |
| 2002/0035663 A1* | 3/2002 | Finn et al. ..................... 711/110 |
| 2006/0004847 A1 | 1/2006 | Claudatos et al. |
| 2006/0036901 A1 | 2/2006 | Yang et al. |
| 2007/0011420 A1 | 1/2007 | Boss et al. |
| 2007/0130236 A1 | 6/2007 | Seeger et al. |
| 2008/0052331 A1 | 2/2008 | Ogawa et al. |

FOREIGN PATENT DOCUMENTS

WO   WO-2008058824   5/2008

OTHER PUBLICATIONS

"StorageTek Defines Fixed Storage Roadmap", Byte and Switch, Jan. 24, 2005, http://www.byteandswitch.com/document.asp?doc_id=66480.
Hoobs et al., "Unlocking the Potential of Information Lifecycle Management: Usage-Based Data Classification for Oracle Databases," Zettapoint, 2008, http://www.dmreview.com/white_papers/10001755-1.html?confirm_page=1.
"Tape's Efficiency as an ILM Compliance Solution: An Interview with Steve Solomon of Fujifilm," Computer Technology Review, Mar. 2005, http://findarticles.com/p/articles/mi_m0BRZ/is_3_25/ai_n14892835.
"Information LifeCycle Management," Bell, http://www.business-solutions.bell.ca/Portals/7/ILM_ English.pdf, Feb. 2007.

* cited by examiner

*Primary Examiner* — Jae U Yu

(57) ABSTRACT

The method may query the disk drive for a size where size may be a total number of logical blocks on the disk drive. The drive may receive a size response where the size includes a total number of logical blocks on the disk drive. The number of usage blocks necessary to represent the number of logical blocks on the disk drive may then be determined and usage data may be stored in the usage blocks. The data may be stored in the buffer of the disk drive. The data may also be stored in the DDF of a RAID drive. The data may be used to permit incremental backups of disk drives by backing up only the blocks that are indicated as having been changed. In addition, information about the access to the drive may be collected and stored for later analysis.

17 Claims, 4 Drawing Sheets

OPTIMIZING INFORMATION LIFECYCLE MANAGEMENT FOR FIXED STORAGE

BACKGROUND

This Background is intended to provide the basic context of this patent application and it is not intended to describe a specific problem to be solved.

Enterprise businesses have to deal with a massive amount of information related to their customers, emails and any proprietary information. Regulatory requirements by various governments also add significantly complexity and need to be complied to avoid running into any legal issues with the government. Today, corporations have to adopt various types of information lifecycle management tools/applications that very expensive to employ and cost more to scale and keep up with the amount of massively data on a daily basis.

Today's solution also put the unnecessary burden on the users. The consumer of the data is given the onus of determining the usage statistics with little knowledge of the underlying hardware or system. This leads to the usage information on hard drives to be anecdotal and usually incorrect, hence, eventually useless. This usage data cannot be easily collected from the host, and on a storage system. In this case, the host has little if any visibility to the underlying disk structure. As enterprise level disk arrays span hundreds or even thousands of hard drives, this usage data is unlikely to be stored on the array as well. Without accurate usage statistics, information lifecycle management can only be implemented at the file, object, or logical unit number level only either on the host or the array.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and system of storing data in a usage block of a disk drive to indicate usage data of the disk drive is disclosed. The method may query the disk drive for a size where size may be a total number of logical blocks on the disk drive. The drive may receive a size response where the size includes a total number of logical blocks on the disk drive. The number of usage blocks necessary to represent the number of logical blocks on the disk drive may then be determined and usage data may be stored in the usage blocks.

The data may be stored in the buffer of the disk drive. The data may also be stored in the DDF of a RAID drive. The data may be used to permit incremental backups of disk drives by backing up only the blocks that are indicated as having been changed. In addition, information about the access to the drive may be collected and stored for later analysis.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
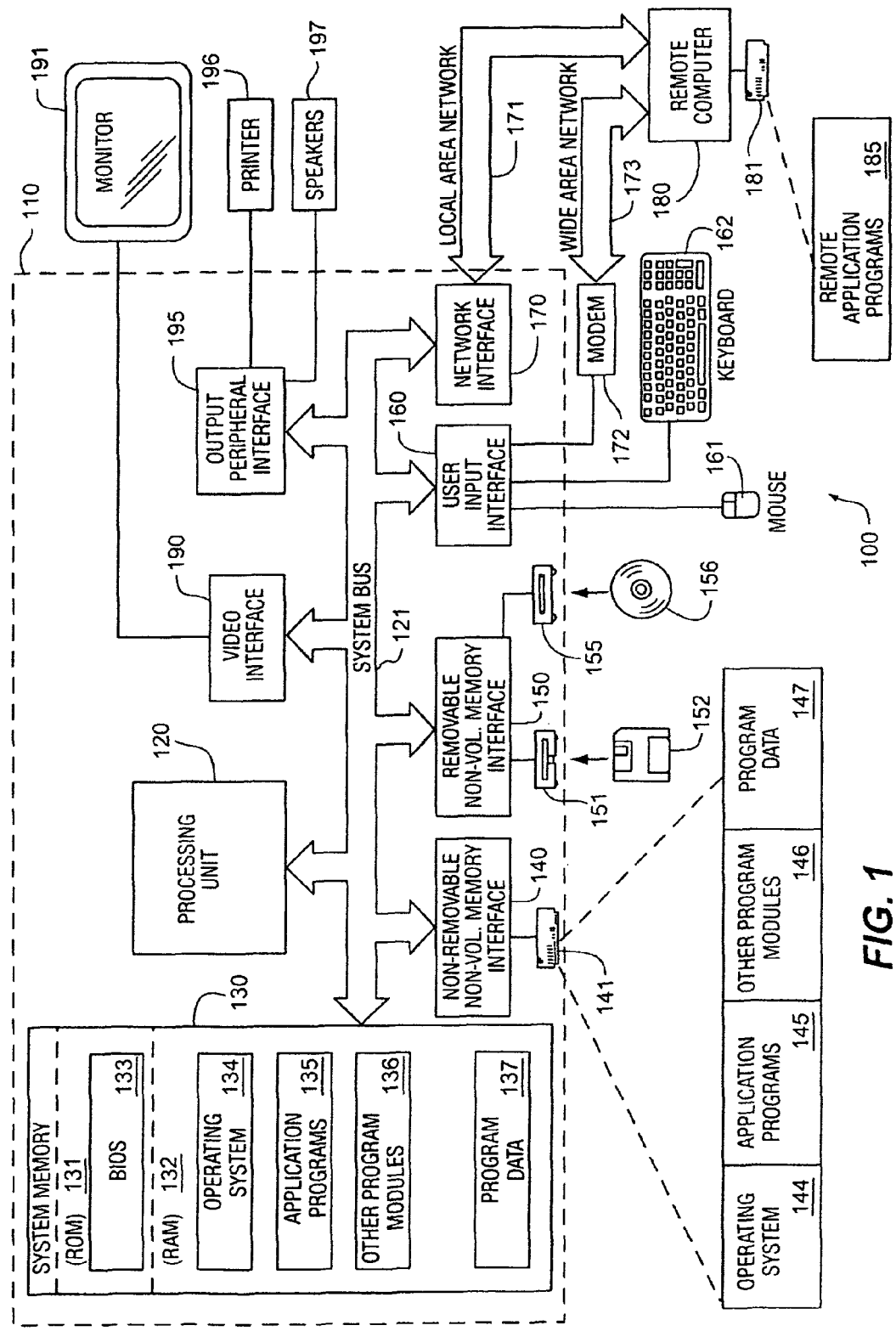
FIG. 1 is an illustration of a computing device.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156.

The hard disk drive 141, 151, and 155 may interface with system bus 121 via interfaces 140, 150.

A user may enter commands and information into the computer 110 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 195.

Figure 2:
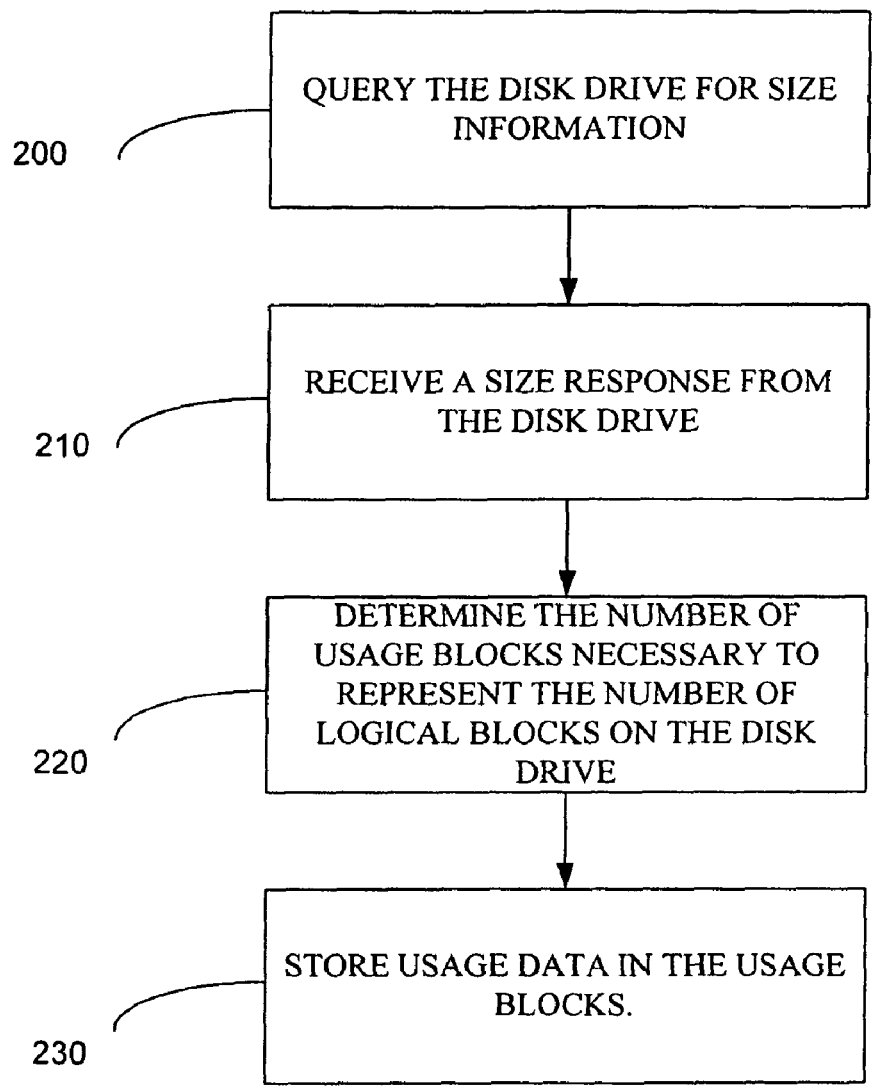
FIG. 2 is an illustration of a method of storing usage data for a disk drive.

FIG. 2 may illustrate a method of storing data in a usage block of a disk drive to indicate usage data of the disk drive. The method may allow for information lifecycle management to be enabled on a per block (smaller chunk of information usually 512 byte chunk) basis on standard hard drives. Each drive may be allocated with a fixed number of usage blocks. The number of usage blocks per drive may be a ratio of 1 byte per 64 KB block on the drive. Five hundred (500) of these bytes may be combined to create a usage block that represents 32,000 KB (500×64 KB). The last 12 bytes of the block may be reserved for setting up the configuration to allow the usage blocks to be customized, and to timestamp each usage block.

These usage blocks may allow any 64 KB of data at a time to have custom settings as to the frequency of the recording, and it may allow up to eight time increments to be recorded. If the frequency is set to days, the drive may record up to eight days of usage information on any block on the disk. The method may be used as an underpinning for either an information lifecycle management solution, or to allow block level incremental backups to occur.

Referring to FIG. 2, at block 200, the method may query the disk drive for size information. In some embodiment, size may be a total number of logical blocks on the disk drive. As an example, a 36 GB hard drive may have 71,687,372 blocks. The size may be indicated by the logical block address of a disk wherein the logical block address represents the number of sectors on a disk.

At block 210, a size response may be received. The size may be a total number of logical blocks on the disk drive. The format of the size may be a variety of different format such as KB, blocks, etc., so long as the unit of measure is known.

Figure 3:
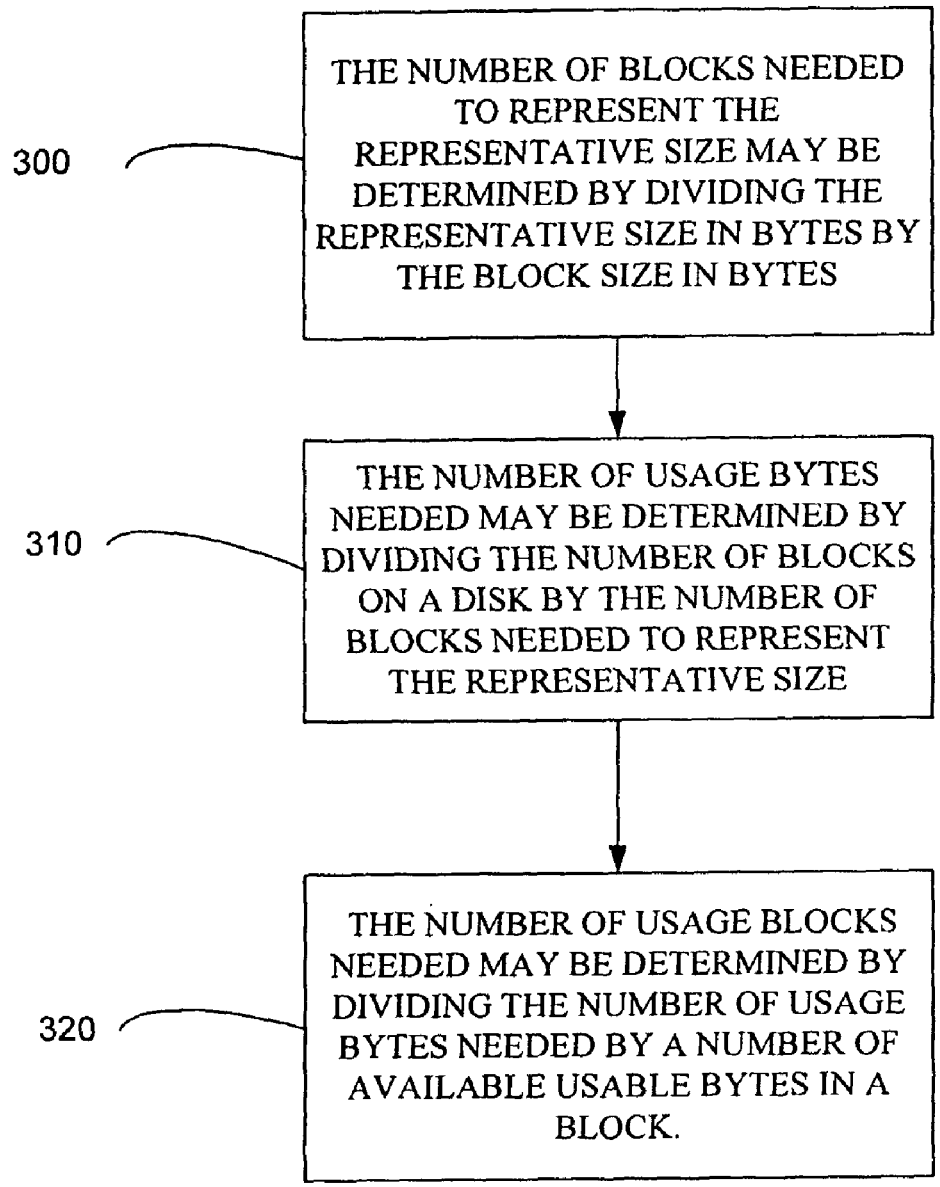
FIG. 3 is an illustration of a method determining the usage blocks need to represent data on the disk drive.

At block 220, the number of usage blocks necessary to represent the number of logical blocks on the disk drive may be determined. FIG. 3 may illustrate one way of determining the number of usage blocks necessary. The logical blocks may be individually addressable and accessible 512 byte blocks. A representative size of data that may be represented by a single byte is 64 KB.

At block 300, the number of blocks needed to represent the representative size may be determined by dividing the representative size in bytes by the block size in bytes, usually 512.

At block 310, the number of usage bytes needed may be determined by dividing the number of blocks on a disk by the number of blocks needed to represent the representative size. The number of blocks may be obtain by querying the disk as described in block 200. The representative size may be the size that is represented by a byte, in this case 64 KB.

At block 320 the number of usage blocks needed may be determined by dividing the number of usage bytes needed (from block 310) by a number of available usable bytes in a block. A block will have a standard quantity of bytes. A common block size is 512 bytes. However, some bytes may be needed for overhead and configuration. Accordingly, the block size in bytes less the configuration bytes leaves the available usable bytes. For example, the logical blocks may be individually addressable and accessible n*512 byte blocks where n is a positive integer.

As an example, a 36 GB hard drive may have 71,687,372 blocks. As this solution uses a single byte to represent 64 KB blocks (64 KB/512 bytes/block=128 blocks), the number of usage bytes needs to be 560,058 bytes (71,687,372 blocks in drive/128 bytes/block). In one embodiment, 500 bytes in a 512 byte block are available for data storage. As 500 Bytes are usable in a single usage block this means that the drive will need 1,121 usage blocks (560,058 bytes/500 available bytes/block).

Referring again to FIG. 2, at block 230, usage data may be stored in the usage blocks. In some embodiments, the usage data is updated when the data is written to the disk drive. In this way, when the drive is not in use, energy is not wasted updating the usage data when the usage data has not changed. In addition, excess wear and tear on the disk is prevented.

In another embodiment, the data is updated periodically. The period may be adjusted based on the drive usage. Backup drives may be updated less frequently than primary drives as backups may only be used once a day at a consistent time. The period may also adapt based on the usage data itself. If a drive receives heavy usage, data may be collected more often and if a drive is used less frequently, data may be collected less frequently. The period may be drive specific or applied to an entire range of drive. If the frequency is set to days, the drive may record up to eight days of usage information on any block on the disk. The method may be used as an underpinning for either an information lifecycle management solution, or to allow block level incremental backups to occur. Of course, other periods are possible and are contemplated.

In some embodiments, the usage data may be stored in a write cache in the disk drive. The method may also be optimized for hybrid drives that have a small amount of flash memory and these usage blocks could be pinned into live memory. This usage block feature enabled on hybrid drives may allow all of the benefits without a decrease in the random performance of the drive being monitored.

The method may also address the potential problem that in a small array of disk drives, a limit is usually a small amount of controller's cache memory, and the reluctance to dedicate any of this precious resource to anything but data cache to increase performance. In a large scale disk drive array, the amount of data may scale out of control very easily as the large scale disk drive arrays support in excess of thousands of individual drives.

The method also may capitalize on a feature of enterprise storage in which the requirement is to disable write cache as the drives write cache cannot be guaranteed to be de-staged before a drive spin down. This is existing and costly yet unused circuitry on most hard drives. More specifically, in most hard drives, cache or memory is included in the disk drive. However, the write cache is almost universally turned off for a variety of reasons. One main reason is that when data is written to a "write back" (as opposed to a write through) arrangement, once the data leaves a server, for example, the server believes the data is stored. However, the data may first be delivered to the write cache and then written to the disk drive. If there is a power loss before the data is written to the disk drive, the data in the write cache will be lost. Accordingly, the write cache is turn off. By turning off the write cache, the issue of losing data in the write cache is reduced. However, by turning off the write cache, it is not used.

The usage data itself may be a wide variety of data including configuration data. It should be noted that two sets of configuration data may exist on the usage block as an application of a partition may fall in the middle of a usage block. The first configuration may be used up until the point of that partition break, while the second configuration may be used for the remainder of the usage block. A ten bit number may be used to define the breakpoint if needed to start using the second configuration. The last twelve bytes on each usage block may be reserved for this configuration data. In one embodiment, the layout of a sample usage block would be as follows;

Byte 0 to 499 each byte represents a 64 KB set of blocks on the hard drive.

determination method. To find a usage block for a particular transfer the following data may be needed.
1) How big is the transfer? Does it span multiple usage bytes, or even multiple usage blocks?
2) What is the address of the usage block for the start of the transfer?
3) What is the address inside that usage block for the byte the start of that transfer?
4) What is the address of the usage block for the end of the transfer?
5) What is the address inside that usage block for the byte the end of that transfer?

The method may progress as follows:

At block 400, the start logical block address of the transfer may be determined. The logical block address may be known or located through a query.

| | |
|---|---|
| Byte 500 | Bit 0-6 is used to determine the time increment level. 0-64 for Config 1 |
| Byte 500 | Bit 7-8 Types of Operations to Log for Config 1 |
| | 00 = Log None (Disable) |
| | 01 = Log Read Operations Only |
| | 10 = Log Write Operations Only |
| | 11 = Log Read and Write Operations |
| Byte 501 | Bit 0-6 is used to determine the time increment level. 0-64 for Config 2 |
| Byte 501 | Bit 7-8 Types of Operations to Log for Config 2 |
| | 00 = Log None (Disable) |
| | 01 = Log Read Operations Only |
| | 10 = Log Write Operations Only |
| | 11 = Log Read and Write Operations |
| Byte 502 | Is broken down into bits as follows |
| | Bit 0-2 Configuration 1 timeframe usage |
| | 000 = Seconds |
| | 001 = Minutes |
| | 010 = Hour |
| | 011 = Day |
| | 100 = Week |
| | 101 = Month |
| | 110 = Manual/Triggered |
| | 111 = Disable |
| | Bit 3-5 Configuration 2 timeframe usage |
| | 000 = Seconds |
| | 001 = Minutes |
| | 010 = Hour |
| | 011 = Day |
| | 100 = Week |
| | 101 = Month |
| | 110 = Manual/Triggered |
| | 111 = Disable |
| | Bit 6-7 Is the high order bits of a 10 bit pointer to the config1/2 breakpoint |
| Byte 503 | Is the low order bits of a 10 bit pointer to the config1/2 breakpoint |
| Byte 504-507 | TimeStamp of creation of Usage Block |
| Byte 508-511 | TimeStamp of last operation on Usage Block |

The method to layout the usage block is to request the logical block address count from a drive. Once this is known, the total number of needed usage blocks can be calculated. This is then subtracted from the logical block address count to find the address of the first usage block. In the above example using a 36 GB drive, the first usage block would be at 71686250 (total logical block addresses (LBA)−Needed Usage Blocks−1 since the method started at block 0). The last usage block would be at location 71,687,372. The address of a first usage block may be determined by taking a total logical block address count and subtracting the number of needed usage blocks less one. The number of blocks transferred may be determined by dividing the number of bytes of data transferred divided by the number of bytes in a block.

Figure 4:
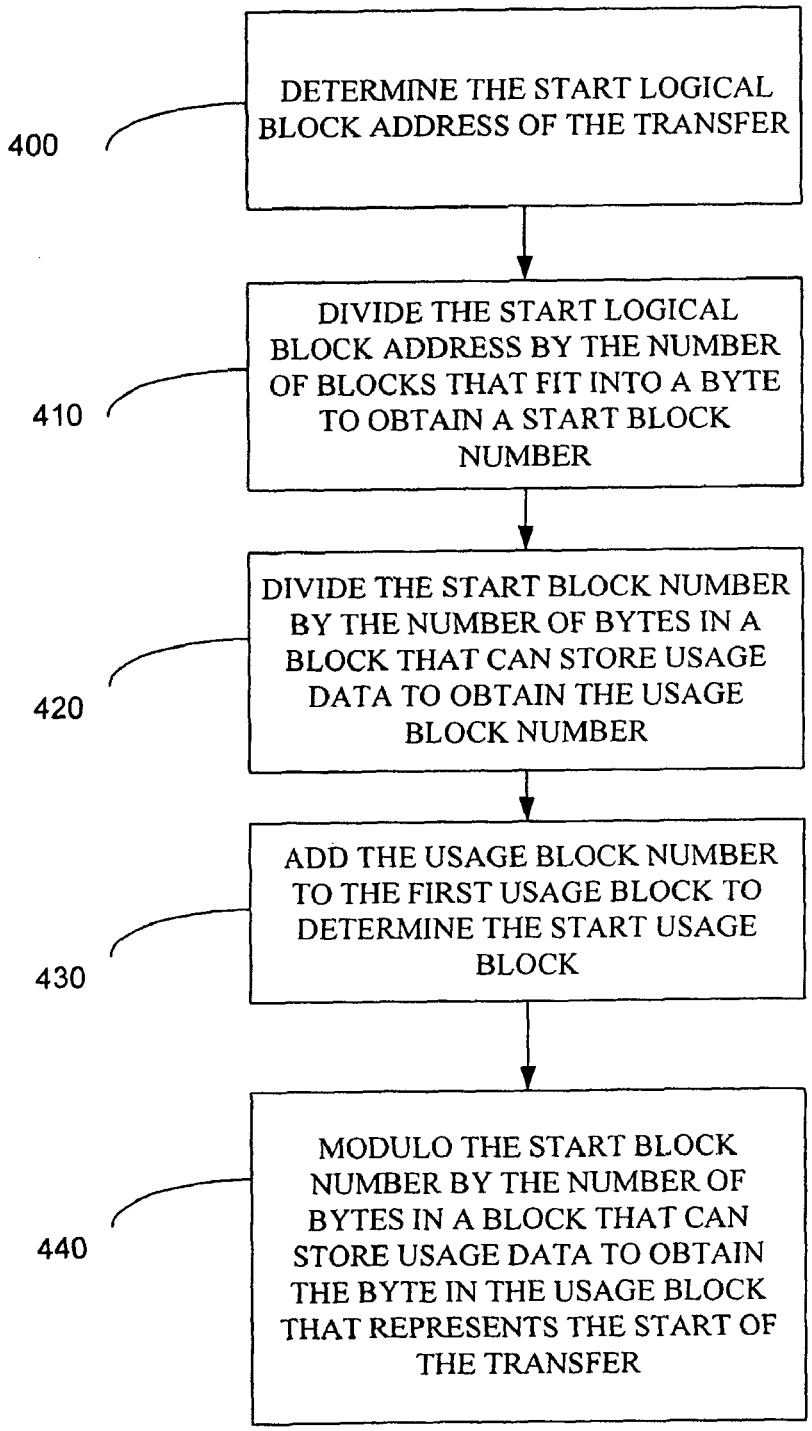
FIG. 4 is an illustration of a method determine the byte in the usage block that represents a specific transfer.

The method also may permit the determination of the usage block for a particular transfer. FIG. 4 may illustrate a possible At block 410, the start logical block address may be divided by the number of blocks that fit into a byte to obtain a start block number. In the previous example there were 500 usable bytes in each block for usage data. Of course, other amounts and size are possible and are contemplated.

At block 420, the start block number may be divided by the number of bytes in a block that can store usage data to obtain the usage block number. At block 430, the usage block number may be added to the first usage block to determine the start usage block. At block 440, the start block number may be subject to a modulo operation by the number of bytes in a block that can store usage data to obtain the byte in the usage block that represents the start of the transfer.

Assume that a transfer is 8 Kbytes in size, and that the logical block address of the transfer is 1,987,654. The start block of the transfer may be at 1,987,654, but since it spans 16 blocks (512 bytes each) its end block would be 1,987,670. To calculate the usage block, the method may take the logical block address of the start of the transfer and DIV it by 128 since 128 blocks may be represented by a single byte (64 KB represented/512 bytes/block=128 blocks). (1,987,654 blocks DIV 128 blocks=155,528). The method may then take this result and DIV it by 500 to find the usage block (155,528 DIV 500=311). This means that the usage block of the start of transfer is the 311th usage block. As the first usage block is located at 71,687,372, 311 is added to the first usage block (71,687,372+311=71,687,683) and retrieve that usage block. Within that usage block, the method may take the remainder of 155,528 MOD 500 (155,528 mod 500=28). This means that the 28th Byte into the 311th usage block represents the start of that transfer.

These same calculations may be repeated for the end block of the transfer. If the usage block for the end of the transfer is the same as the start of the transfer then the transfer does not span usage blocks. If the usage byte of the end of the transfer matches the usage byte of the start of the transfer matches then the transfer does not span usage bytes.

Another embodiment is to use intra device dynamic random access memory (DRAM) or intra array DRAM to collect data for a database. The data may be such data as who is querying the disk drive, when someone is querying the disk drive and how much the disk drive is being used.

The DRAM may be integrated with the host using protocol extension to enable "smart" storage devices to collect data dynamically. For example, the method may collect dynamically generated data collection tables and scriplets. The collection may be dynamic in that it may changed based on the usage of the disk drive or based on projected usage in the future. Such data tables would allow elaborate data collection, based on block placement, aggregated groups of blocks and even block content. The data in the tables may be used for a variety of purposes such as calculating statistics about disk usage, disk errors, need for disk backups, disk capacity, etc. These statistics may be used to analyze past performance, may be used to correlate with disk errors or other problems and may be used to forecast disk usage in the future. In addition, the data may be used for power management purposes. For example, disks that are only used once a day at a given time may be powered off during non-usage times to save electricity. As another example, disks that are used heavily more be located in a cooler room that disks that are used more infrequently.

Scriplets may be created by the host management software and may be used for just in time report s or analysis compiled on the fly and ran by the firmware extension. The scriplets may be added, modified or deleted remotely to collect data dynamically or based on changed requests. The scriplets may also be "smart" or dynamic in that different scriplets may automatically become active based on the disk usage. For example, if a disk is used extensively, a first scriplet may be used and if the disk is just a backup disk, another scriplet may be useful. Of course, other manners of collecting data are possible and are contemplated. For example, virtually all data regarding access attempts may be collected and stored for instantaneous warnings or later analysis.

Once the locations of the usage blocks to retrieve is known, it may be known which bytes should be modified. The usage blocks may be decrypted.

Assume the following of the usage configuration blocks.

| | | |
|---|---|---|
| Byte 500-503 | CA-DA-01-01 | |
| 00 | 00000000 | 00 |
| 30 | 00110000 | 48 |
| 3C | 00111100 | 60 |
| 1B | 00011011 | 27 |
| Byte 504-507 | 04-D1-FE-AA (hex) | |
| Byte 508-511 | 04-D2-FF-AE (hex) | |

Assume also that the current system time is 04-D5-01-FF

As the increment of time, the timeframe, and the current time versus the birth time of the drive are known, the method may calculate if the usage block needs to be rotated. As the usage block could contain the middle of a partition break, and the front part of the block may be different from the last part of the block, the method may need to perform this calculate separately for each half of the usage block and combine the results.

If (Last_Timestamp−creation_timestamp) DIV TimeIncrement is NOT equal to (Current_Timestamp−Creation_Timestamp) div increment (172800) then the method may change the usage bytes across the entire usage block that represents that configuration set. The method may need to right shift each byte in the set of 500 by as many times as the window has passed. To do this, the method may read each byte of the set of 500, and do a single right-shift for each increment missed. Once this right-shifting is done, the method may update the block the method opened the usage block to update, modify the last saved timestamp, and save the usage block back to the disk.

In this case, the usage byte may be read as such. If the method wished to know how much a specific 64 KB section of a disk has been used, and the method has previously set up the usage blocks to record this data. The method may do the following. The method may determine which parts of the disk to wish to query. Assume the method wants to know how recently or how heavily used block 564,321 has been used. The method may retrieve the usage block, and identify the usage byte that represented that block. Assume that the usage block was the exact same as the previous example. If the usage blocks last save was in the same time window as the current time, the method would continue as normal, otherwise the method would update the block using the time right-shift procedure listed above. The method could then find the usage byte that represented the logical bit address 564,321. It may return a value of 9. This value would indicate a byte that looked like this 0001001. This may indicate that inside of the current 48 hour window, this block may not have been touched. It also may not have been touched in the previous two 48 hour windows. As it is logging reads and writes, the method may know that the file has been accessed in some way in the 4th 48 hour back, and in the 8th 48 hour window back.

If the method was using usage blocks to enable block level incremental backups, the method make attempt to set a usage configuration to only track write operations, and set an increment to match your backup frequency. The method may then implement a full backup once, and then only backup 64 kb blocks that showed modification.

If the method is attempting to determine suitability for moving high cost storage to lower cost slower storage, the method may enable the drives to store the per operation instead of per time interval, or the method may set a faster time interval to determine performance needs. The value of the byte may be automatically weighted towards allowing information lifetime management consumption. The blocks with a lowest bit value may be the least used and least recently used. A recent usage may automatically bump up the value of the byte by 128 and allows very simple calculations that are already weighted towards current usage, and diminish with time. The method may also perform a simple SUM of the bits that represent a block to get a rough usage map, or could use the usage blocks to create a usage histogram.

The above described concept may be extended to common RAID disk data format (DDF). RAID drives may have a vendor specific area of the DDF. The Storage Network Industry Association (SNIA) Common RAID Disk Data Format defines a standard data structure describing how data is formatted across disks in a RAID group. The DDF structure may allow a basic level of interoperability between different suppliers of RAID technology. The Common RAID DDF structure benefits storage users by enabling data-in-place migration among systems from different vendors. The DDF may be used to store usage block data related to a RAID (or other drive connected to the RAID group) of a disk drive to indicate usage data of the disk drive.

Sample Case 1, Cost-Effective and Scalable Information Lifestyle Management

An array manufacturer uses two types of drives, 72 GB 15K RPM drives in RAID 0+1, and 750 GB 7200 RPM drives in RAID 5. As the 72 GB drive sets are roughly 20× the performance, but only 1/10th the capacity, these represent two diametrically opposed methods of deploying storage. In this case, the array controller may let the host know that it has 100 GB of space. That space is spread across all of the 72 GB drives, and costs in excess of $100 per GB. The array controller sets the usage blocks to record in hourly increments, and records 8 hours of performance data on each of those expensive 72 GB drives. It is determined that only 10 GB of the 100 GB are regularly accessed. The array controller could remap the blocks that represent the rarely touched data onto the less costly 750 GB drives without the host knowing. The array controller would then migrate the data 64 KB blocks one block at a time. Since the 750 GB drives represent a cost of less than $10 per GB, this allows the array to host significantly more capacity without sacrificing performance.

Sample Case 2—Efficient Backup for Data Center

A backup vendor wants to take a backup of a working system. The file system is far too complex to be backed up using conventional file level backup techniques. The file system consists of 256 Directories wide, 256 directories deep, and 256 files per directory each that is less than 2 KB in size. The act of finding the file to backup via the directory system takes longer to backup than the file itself. This type of backup can take 60 hours, while a block level backup can occur in less than 4. The historical weakness of block level backups has been that they are always Full backups, and the backup vendor cannot use the advances in incremental backup since blocks do not contain a catalog or archive bit. Usage blocks can function as this archive bit, and allow for not only a incremental but also a differential level backup. This usage would require the setting of the usage block to measure all changes to the block based on the frequency of the backup window. If you know that your backup window happens nightly, and that you issue a full backup on each weekend. You would ignore the usage block on your full day. On the incremental day you would look at each usage block and determine which 64 KB blocks must be copied to tape to ensure that you only backed up changed block instead of the entire logical unit number (LUN). The method of backup would work regardless of the file system that exists on that LUN as it occurs at a lower point.

Sample Case 3—Speedup Remote Replication between Data Centers

The proposed invention can be applied to incrementally back up only modified blocks for site to site replication by using the usage blocks to determine what modified blocks needs to be sent to a remote site. This method of using the usage blocks is like using them as dirty-cache page blocks, and gives the replication software a method to quickly catch up on a replication set without requiring a full resynchronization.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of storing data in a usage block of a disk drive to indicate usage data of the disk drive comprising;
   Querying the disk drive for size wherein size comprises a total number of logical blocks on the disk drive;
   Receiving a size response wherein the size comprises a total number of logical blocks on the disk drive;
   Determining the number of usage blocks necessary to represent the number of logical blocks on the disk drive; and
   Storing usage data in the usage blocks, wherein the logical blocks are individually addressable and accessible n*512 byte blocks where n is a positive integer;
   determining the first address for the usage block by subtracting the needed usage blocks by 1 from the total number of block on the disk drive;
   determining the usage block for a particular transfer comprising:
   determine the start logical block address of the transfer;
   divide the start logical block address by the number of blocks that fit into a byte to obtain a start block number;
   divide the start block number by the number of bytes in a block that can store usage data to obtain the usage block number;
   adding the usage block number to the first usage block to determine the start usage block; and
   modulo the start block number by the number of bytes in a block that can store usage data to obtain the byte in the usage block that represents the start of the transfer.

2. The method of claim 1, further comprising storing the usage data in a write cache in the disk drive.

3. The method of claim 2, wherein the cache is non-volatile cache.

4. The method of claim 1, further comprising determining the address of first usage block by taking a logical block address count and subtracting the number of needed usage blocks less one.

5. The method of claim 1, wherein the size is indicated by the logical block address of a disk wherein the logical block address represents the number of sectors on a disk.

6. The method of claim 1, further comprising updating the usage data when data is written to the disk drive.

7. The method of claim 1, further comprising updating the data periodically.

8. The method of claim 1, further comprising storing the usage data in the usage blocks in the DDF of a RAID disk drive.

9. The method of claim 8, further comprising determining the number of blocks needed to represent the representative size by dividing the representative size in bytes by the block size in bytes.

10. The method of claim 9, further comprising determining the number of usage bytes needed by dividing the number of blocks on a disk by the number of blocks needed to represent the representative size.

11. The method of claim 9, further comprising determining the number of usage blocks needed by dividing the number of usage bytes needed by a number of available usable bytes in a block.

12. The method of claim 9, wherein the usage block comprises usage information and configuration data.

13. The method of claim 1, wherein the configuration data comprises data to instruct the method to look to a second partition of the usage block if the block is separated in two.

14. The method of claim 1, further comprising determining the number of blocks transferred further comprises divide the number of bytes of data transferred divided by the number of bytes in a block.

15. The method of claim 1, further comprising using the usage data to determine modified block and backing up the modified blocks.

16. The method of claim 1, further comprising collecting drive access data, storing it in a database, analyzing the data in the database and creating reports based on the analysis.

17. The method of claim 16, wherein the drive access data is used by statistics applications to analyze past performance or predict future performance.

\* \* \* \* \*